United States Patent [19]
Grey

[11] 3,890,036
[45] June 17, 1975

[54] ZOOM LENS SYSTEM

[75] Inventor: David S. Grey, Lexington, Mass.

[73] Assignee: Berkey Photo, Inc., Paramus, N.J.

[22] Filed: Feb. 28, 1974

[21] Appl. No.: 446,704

[52] U.S. Cl................................ 350/184; 350/187
[51] Int. Cl. ......................................... G02b 15/00
[58] Field of Search........................... 350/184, 187

[56] References Cited
UNITED STATES PATENTS

| | | | |
|---|---|---|---|
| 3,294,470 | 12/1966 | Dakin et al. | 350/184 |
| 3,438,689 | 4/1969 | Wehr | 350/184 |
| 3,784,285 | 1/1974 | Wantanabe | 350/184 |

Primary Examiner—Ronald L. Wibert
Assistant Examiner—Conrad Clark
Attorney, Agent, or Firm—Neuman, Williams, Anderson & Olson

[57] ABSTRACT

A zoom lens system for a camera, particularly a Super-8 motion picture camera is disclosed. The lens system includes, generally eight lenses, the design of which is in accordance with certain specified parameters, and means are provided for adjustably positioning certain of the lenses with respect to one another in a manner providing a continuously variable range of focal lengths from approximately 9 mm. to approximately 23 mm. at a speed of $f/1.18$.

8 Claims, 3 Drawing Figures

FIG. 2    $f = 1.18$    ZOOM RATIO 2.5:1    9-23 mm

| LENS ELEMENT | RADII mm | CLEAR APERTURE DIAMETER | THICKNESS AND SPACING mm | MATERIAL |
|---|---|---|---|---|
| I | $R_1$ -64.90<br>$R_2$ +42.190 | 28.86<br>28.89 | $T_1$ = 1.207<br>$S_1$ = VARIABLE<br>(29.612 to 4.785) | SK-15 |
| II | $R_3$ Plano<br>$R_4$ 36.609 | 29.51<br>29.88 | $T_2$ = 4.414<br>$S_2$ = 0.118 | SK-15 |
| III | $R_5$ 27.589<br>$R_6$ -92.480 | 29.46<br>28.85 | $T_3$ = 6.602<br>$S_3$ = VARIAIABLE<br>(1.897 to 5.307) | SK-15 |
| IV | $R_7$ -92.467<br>$R_8$ +92.467 | 21.20<br>20.12 | $T_4$ = 1.208<br>$S_4$ VARIABLE<br>(7.098 to 28.515)<br>Stop to $R_9$ = 3.261 | SF-6 |
| V | $R_9$ -6.764<br>$R_{10}$ -10.564 | 9.07<br>12.57 | $T_5$ = 6.545<br>S = 0.126 | LaK N-9 |
| VI | $R_{11}$ -64.900<br>$R_{12}$ -16.499 | 12.52<br>12.62 | $T_6$ = 2.339<br>$S_6$ = 0.125 | LaK N-9 |
| VII | $R_{13}$ 12.781<br>$R_{14}$ -12.781 | 11.24<br>9.81 | $T_7$ = 4.262<br>S = 0 | LaK N-9 |
| VIII | $R_{15}$ = $R_{14}$<br>$R_{16}$ 51.670 | 9.4 | $T_8$ = 1.019<br>BF = 9.450 | SF-6 |

| FOCAL LENGTH mm | $S_1$ mm | $S_3$ mm | $S_4$ mm |
|---|---|---|---|
| 9.004 | 29.612 | 1.897 | 7.098 |
| 10.288 | 25.279 | 1.338 | 11.990 |
| 11.614 | 21.424 | 1.184 (MINIMUM SHIFT) | 15.999 |
| 11.971 | 20.480 | 1.197 | 16.931 |
| 13.929 | 15.895 | 1.563 | 21.158 |
| 16.208 | 11.551 | 2.450 | 24.606 |
| 19.439 | 6.736 | 4.250 | 27.621 |
| 21.032 | 4.785 | 5.307 | 28.515 |

ZOOM LENS SYSTEM

BACKGROUND OF THE INVENTION

This invention relates to a zoom lens system for a camera. The zoom lens system of this invention is a high quality system and is particularly adapted for use in a motion picture camera to produce an image of the Super-8 format. This zoom lens system is of the type which includes two zooming components providing a continuously variable range of focal lengths from telephoto to wide-angle. The lens system is mechanically compensated by shifting one of the two zooming components with respect to the other, thereby eliminating defocusing, and the image position of focal point remains substantially stationary throughout all changes of focal length.

It is an object of this invention to provide a lens system particularly adapted for a Super-8 motion picture camera having a continuously variable range of focal lengths from approximately 9 mm. to approximately 23 mm. and having a speed or relative aperture of $f/1.18$. The lens system is of a construction suitable for economical manufacture and yet is capable of superior performance. The system has a design zoom ratio of 2.5 to 1.

SUMMARY OF THE INVENTION

The zoom lens system constructed in accordance with one embodiment of this invention includes generally eight lenses, the design of which is in accordance with certain specified parameters as follows:

| LENS ELEMENT | RADII (mm.) | THICKNESS AND SPACING (mm.) |
|---|---|---|
| I | $R_1$ −64.90 | $T_1$=1.207 |
|   | $R_2$ +42.190 | $S_1$=Variable |
| II | $R_3$ Plano | $T_2$=4.414 |
|   | $R_4$ −36.609 | $S_2$=0.118 |
| III | $R_5$ +27.589 | $T_3$=6.602 |
|   | $R_6$ −92.480 | $S_3$=Variable |
| IV | $R_7$ −92.467 | $T_4$=1.208 |
|   | $R_8$ +92.467 | $S_4$=Variable |
| V | $R_9$ −6.764 | $T_5$=6.545 |
|   | $R_{10}$ −10.564 | $S_5$=0.126 |
| VI | $R_{11}$ −64.900 | $T_6$=2.339 |
|   | $R_{12}$ −16.499 | $S_6$=0.125 |
| VII | $R_{13}$ +12.781 | $T_7$=4.262 |
|   | $R_{14}$ −12.781 | $S_7$=0 |
| VIII | $R_{15}$=$R_{14}$ | $T_8$=1.019 |
|   | $R_{16}$ +51.670 | BF=9.450 |

Means is also provided for adjustably positioning lenses II and III with respect to lens element I and lens element IV with respect to lens elements II and III, thereby providing a continuously variable range of focal lengths from approximately 9 mm. to approximately 23 mm. at a speed of $f/1.18$.

BRIEF DESCRIPTION OF THE DRAWINGS

FIG. 2 is a table giving the optical specifications and constructional data for the zoom lens system shown in FIG. 1.

DETAILED DESCRIPTION OF THE PREFERRED EMBODIMENT

Figure 1:
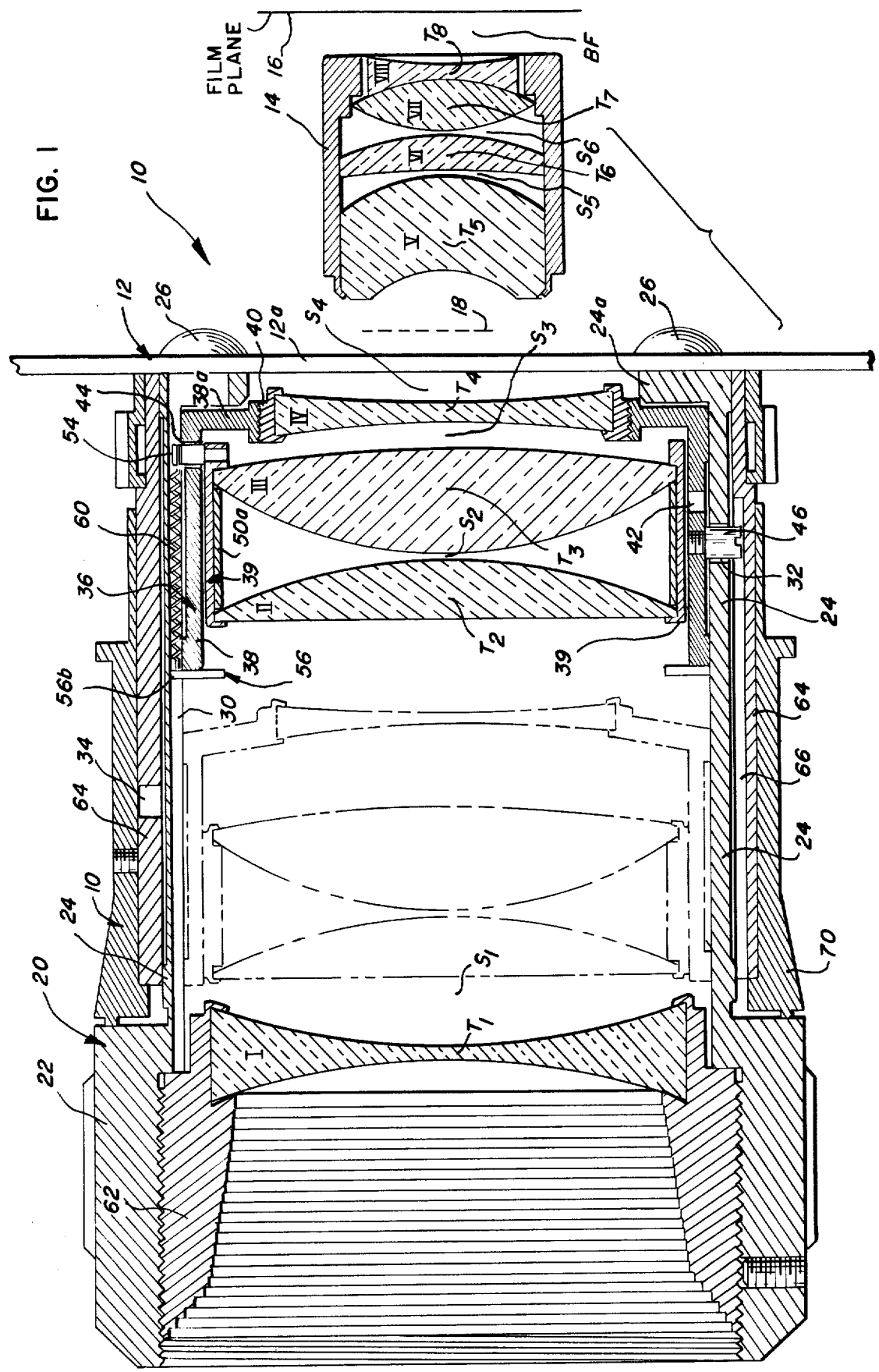
FIG. 1 is a sectional view taken longitudinally through the lens system to illustrate its construction, the positions of adjustment of the zooming components being illustrated respectively for the wide-angle position in solid lines and for the telephoto position in dotted lines.

In FIG. 1 there is illustrated a lens system 10 constructed in accordance with this invention. The lens system includes eight lenses identified by numerals I, II, III, IV, V, VI, VII and VIII. The lens system may be considered as having two sections, a front, or zoom lens section, consisting of lenses I throught IV and a rear, or taking lens section, consisting of lenses V through VIII. In the front, or zoom lens section, lens I is a fixed biconcave lens, lens II is a plano-convex lens, lens III is a biconvex lens and lens IV is a biconvex lens. Lenses II and III are fixed together as an air spaced doublet and mounted for movement as a unit with respect to the biconcave lens I between a wide-angle position and a telephoto position. Lens IV is a biconcave lens mounted both for zooming movement with respect to lens I and for compensating movement with respect to the doublet II–III. The biconcave lens IV is moved through its various positions relative to the doublet II–III to mechanically compensate and eliminate defocusing of the image position of focal point of the lens system, so that the focal point remains stationary, i.e., in the film plane, throughout the change of focal length of the system during zooming.

The rear or taking lens section of the zoom lens system includes a divergent meniscus lens VI, and a cemented doublet consisting of biconvex lens VII and biconcave lens VIII. This rear or taking lens section is designed to compensate for aberrations produced by the front, or zoom lens section. These two sections are combined to form a zoom lens system having a $f$ number of 1.18 and focal lengths variable between 9 mm. and 23 mm. for an image of Super-8 motion picture format. The design zoom ratio is 2.5 to 1.

The constructional data, characteristics and the relationship between the lenses for the zoom lens system are set forth in the table below, wherein $R_1$ to $R_{16}$ designate the radii or curvatures of the refractive surfaces, $T_1$ to $T_8$ designate the axial thicknesses of the lens elements and $S_1$ to $S_2$ designate the spaces between the lens elements:

TABLE 1

| | | | |
|---|---|---|---|
| f=1.18 | Zoom Ratio 2.5:1 | | 9–23 mm. |
| LENS ELEMENT | RADII (mm.) | CLEAR APERTURE DIAMETER | THICKNESS AND SPACING (mm.) | MATERIAL |
| I | $R_1$ −64.900 | 28.86 | $T_1$=1.207 | SK-15 |
|   | $R_2$ +42.190 | 28.89 | $S_1$=Variable (29.612 to 4.785) | |

TABLE 1

| LENS ELEMENT | RADII (mm.) | CLEAR APERTURE DIAMETER | THICKNESS AND SPACING (mm.) | MATERIAL |
|---|---|---|---|---|
| | f=1.18 | Zoom Ratio 2.5:1 | 9–23 mm. | |
| II | $R_3$ Plano | 29.51 | $T_2$=4.414 | SK-15 |
| | $R_4$−36.609 | 29.88 | $S_2$=0.118 | |
| III | $R_5$+27.589 | 29.46 | $T_3$=6.602 | SK-15 |
| | $R_6$−92.480 | 28.85 | $S_3$=Variable (1.897 to 5.307) | |
| IV | $R_7$−92.467 | 21.20 | $T_4$=1.208 | SF-6 |
| | $R_8$+92.467 | 20.12 | $S_4$ to Stop = Variable (7.098 to 28.515) Stop to $R_9$=3.261 | |
| V | $R_9$−6.764 | 9.07 | $T_5$=6.545 | LaK N-9 |
| | $R_{10}$−10.564 | 12.57 | $S_5$=0.126 | |
| VI | $R_{11}$−64.900 | 12.52 | $T_6$=2.339 | LaK N-9 |
| | $R_{12}$−16.499 | 12.62 | $S_6$=0.125 | |
| VII | $R_{13}$+12.781 | 11.24 | $T_7$=4.262 | LaK N-9 |
| | $R_{14}$−12.781 | 9.81 | $S_7$=0 | |
| VIII | $R_{15}$=$R_{14}$ | — | $T_8$=1.019 | SF-6 |
| | $R_{16}$+51.670 | 9.4 | BF=9.450 | |

With respect to the glass materials of Table 1, SK-15 is a dense barium crown glass having a mean index of refraction of 1.62555 and a Nu ($\nu$) value of 57.79. The material SF-6 is a dense flint glass having a mean index of refraction of 1.81265 and a Nu ($\nu$) value of 25.24. The material LaK N-9 is a lanthanum crown glass having a mean index of refraction of 1.69401 and a Nu ($\nu$) value of 54.48. The movement of lenses II, III and IV and the variable spacings $S_1$, $S_3$ and $S_4$ are set forth in Table 2 below for various selected focal lengths.

TABLE 2

| FOCAL LENGTH mm. | $S_1$ | $S_3$ | $S_4$ |
|---|---|---|---|
| 9.004 | 29.612 | 1.897 | 7.098 |
| 10.288 | 25.279 | 1.338 | 11.990 |
| 11.614 | 21.424 | 1.184 (Minimum Shift) | 15.999 |
| 11.971 | 20.480 | 1.197 | 16.931 |
| 13.929 | 15.895 | 1.563 | 21.158 |
| 16.208 | 11.551 | 2.450 | 24.606 |
| 19.439 | 6.736 | 4.250 | 27.621 |
| 21.032 | 4.785 | 5.307 | 28.515 |

In Table 3 below, there is shown the effective focal lengths and back focal lengths in millimeters of the eight lens elements forming the zoom lens system of the invention herein described. As previously stated, the movement of lens IV with respect to the doublet consisting of lenses II and III is such that the back focal length of the system remains constant i.e., at approximately 9.450 mm. All of the lenses of the rear or taking lens section consisting of lenses V through VIII are fixed with respect to one another with the effective focal length of that section being 11.841 mm. and the back focal length of that section being 12.907 mm.

TABLE 3

| LENS | EFL (mm.) | BFL (mm.) |
|---|---|---|
| I | −40.475 | −40.766 |
| II | 58.205 | 58.205 |
| III | 34.519 | 31.327 |
| II & III Doublet | 21.921 | 18.327 |
| IV | −56.106 | −56.437 |
| V | −92.312 | −129.023 |
| VI | 31.087 | 31.548 |
| VII & VIII | 30.371 | 25.423 |
| V − VIII Section | 11.841 | 12.907 |

BFL for System = 9.450 mm.

The back focal length for the system of 9.450 mm. is figured with the object at a distance of 15 feet. The separation between the movable components of the zoom lens section of the system may be computed using the zoom lens formula below for two moving lenses with the object and image fixed. In this formula, L is the distance between the object and the image; M is the magnification between the object and the image planes; $\phi_1$ is the reciprocal of the focal length of the doublet consisting of lens elements II and III; $\phi_2$ is the reciprocal of the focal length of lens IV; and T is the separation between the lenses in millimeters.

$$\frac{(M+1)^2}{M} = L(\phi_1 + \phi_2 - T \cdot \phi_1 \cdot \phi_2) + T^2 \cdot \phi_1 \cdot \phi_2$$

In this formula, the value of the magnification between the object and the image planes is inserted and the value for T is solved by means of the quadratic equation. The equation is a thin lens formula, and in practice the object and image separation L and the lens separations themselves should be corrected for the principal point separation of the components.

In examining the data of Table 2, it will be noted that for each focal length the sum of the variable spacings $S_1$, $S_3$ and $S_4$ is equal to 38.607 mm. This is so because lenses I and V are fixed with respect to one another, and the three intermediate lenses II, III and IV are relatively movable with respect to the two fixed lenses I and V.

In FIG. 1, there is shown one form of mounting mechanism for the lenses whereby the lenses are maintained in proper relationship with respect to one another and with respect to the film plane and the camera stop. The rear or taking lens assembly consisting of lens IV through VIII are mounted within the camera body 12 in a lens mount 14 which is fixed in position between the film plane 16 and the stop 18. In this embodiment, the distance between the stop and the film plane is 27.127 mm. Since lens VIII is positioned 9.450 mm. from the film plane, (equal to the back focal length of the system), and since the total of the spacings between and thicknesses of the four lenses of the taking lens section is 14.416 mm., the distance between the stop 18 and the lens V along the longitudinal axis is 3.261 mm. Fastened to the lens mounting plate 12a of the camera body is a fixed lens barrel 20 having a forward portion 22 and a rearward portion 24. The rearward portion 24 has a flat annular end 24a, and this end is preferably apertured and threaded to receive threaded fasteners 26 which extend through the front lens mounting plate 12a of the camera body 12 and permanently affix the fixed lens barrel 20 in position on the camera. Of course, various other well-known mounting means may be employed to affix the forward section of the system to the camera body.

Figure 3:
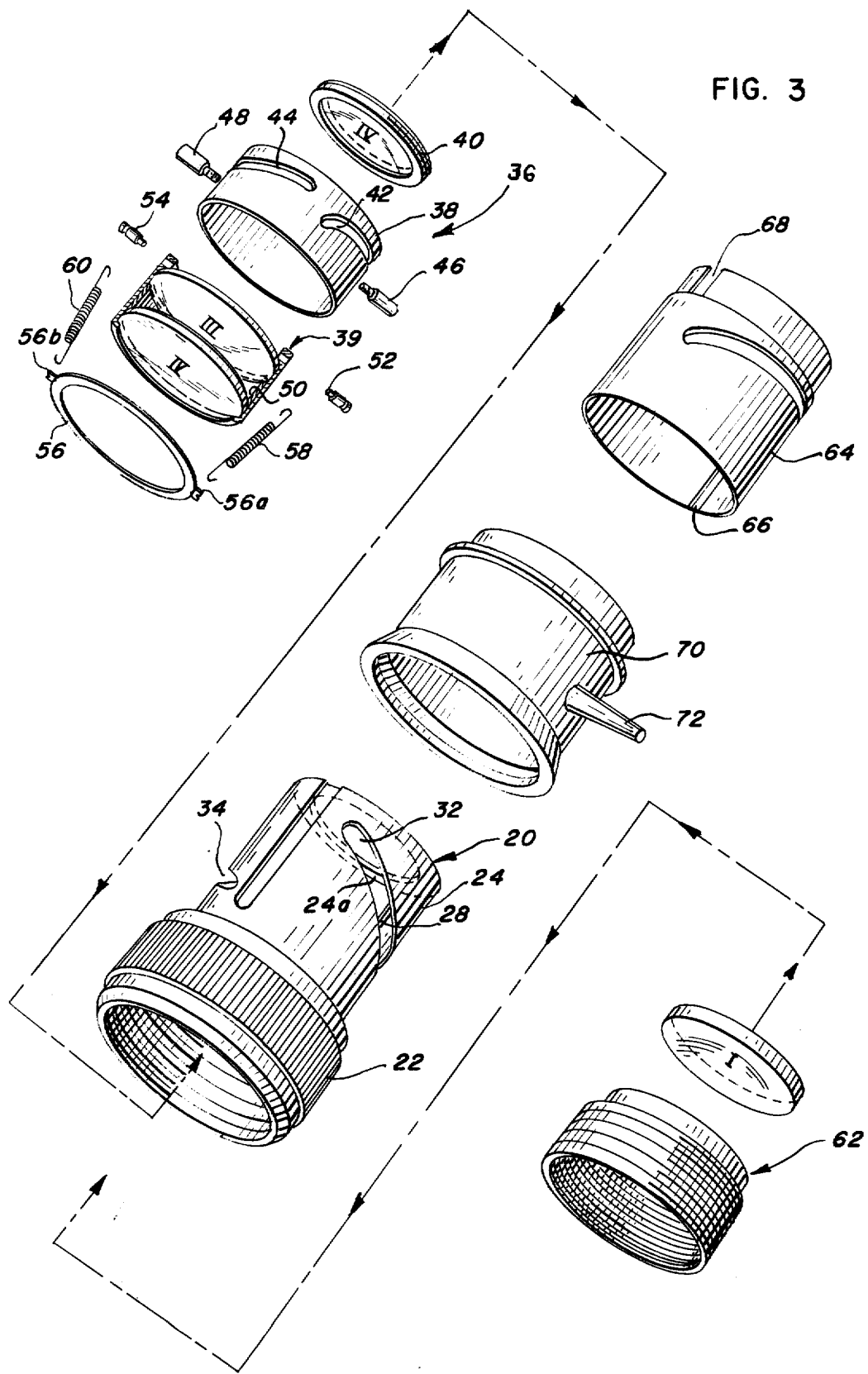
FIG. 3 is an exploded perspective view of the forward section of the optical system of FIG. 1 showing the mechanism for effecting relative movement of the zooming components with respect to each other and with respect to the other lenses of the system.

Within the bore of the rearward portion 24 of the fixed lens barrel is a longitudinal guide means in the form of a pair of oppositely disposed grooves 28 (See FIG. 1) and 30 (See FIG. 2). Extending through the wall of the rearward portion 24 of the fixed lens barrel are two spiral shaped outer cam slots 32 and 34. The spiral slots 32 and 34 extend forwardly and approximately 144° around the circumference of the fixed lens barrel. Within the bore of the fixed lens barrel 20 is a movable lens assembly 36, illustrated in FIG. 3. This assembly includes a rear lens barrel 38 and a movable interior lens mount 39. The rear lens barrel 38 has its rearward end 38a turned inwardly and internally threaded to receive the mounting ring 40 for the lens IV. The rear lens barrel 38 also has a pair of oppositely disposed arcuately shaped inner cam slots 42 and 44 which extend completely through the wall of the rear lens barrel and extend over a turning radius of approximately 148°. A pair of pin-like outer cam followers 46 and 48 are threaded into and extend outwardly from the exterior surface of the rear lens barrel 38. These outer cam followers 46 and 48 are adapted to extend through and slide within the outer cam slots 32 and 34 respectively in the rearward portion 24 of the fixed lens barrel 20, as will be more fully described.

The interior lens mount 39 is mounted for improvement within the bore of the rear lens barrel 38, and it is adapted to hold lenses II and III in fixed position relative to one another with the aid of an annular spacer 50 disposed between the lenses. A pair of pin-like inner cam followers 52 and 54 have their ends fitted into apertures in the interior lens mount 39 and extend outwardly therefrom into the inner cam slots 42 and 44 of the rear lens barrel 38. At the foward end of the rear lens barrel there is an annular washer 56 having oppositely disposed ears 56a and 56b which are respectively connected to the outwardly extending cam followers 52 and 54 by means of coil spring members 58 and 60. The washer 56 and the springs 58 and 60 serve to maintain the cam followers 52 and 54 in sliding contact with the forward face of the inner cam slots 42 and 44 at all times.

The movable lens assembly 36 is disposed within the bore of the rearward portion 24 of the fixed lens barrel 20 and the pin-like outer cam followers 46 and 48 extend outwardly through the cam slots 32 and 34, respectively in the fixed lens barrel. The inner cam followers 52 and 54, together with the springs 58 and 60 and the ears 56a and 56b of the retaining ring 56, are disposed within the longitudinal grooves 28 and 30 within the bore of the fixed lens barrel rearward portion 24.

An externally threaded forward lens mount 62 carries the forward lens I and is threaded into the forward portion 22 of the fixed lens barrel. Surrounding the rearward portion 24 of the fixed lens barrel is a sleeve-like drive barrel 64 having longitudinal guide means in the form of a pair of oppositely disposed grooves 66 and 68 in its bore. The pin-like outer cam followers 46 and 48 which extend through the spiral cam slots 32 and 34 in the rearward portion of the fixed lens barrel also extend into these grooves 66 and 68 in the bore of the drive barrel 64. Over the drive barrel 64 is positioned a zoom ring 70 which preferably has an outwardly extending operating post 72. The zoom ring is locked in position on the exterior surface of the drive barrel 64 so that rotation of the zoom ring 70 by means of the post 72 will also effect rotation of the drive barrel.

The assembled zoom lens system is shown in FIG. 1. In operation, the rotation of the zoom ring 70 and the drive barrel 64 will cause the rotation of the outer cam followers 46 and 48 which are attached to the rear lens barrel 38 and extend within the grooves 66 and 68 of the drive barrel. Since the outer cam followers extend through the spiral outer cam slots 32 and 34 of the fixed lens barrel 20, the rear lens barrel 38 to which the outer cam followers are attached will not only rotate but it will move forwardly in a spiral fashion following the spiral configuration of the outer cam slots 32 and 34. As the outer cam followers 46 and 48 are rotated by the drive barrel 64 and follow the outer cam slots, they will slide forwardly in the longitudinal grooves 66 and 68 in the bore of the drive barrel. The rear lens barrel 38 thus moves along a spiral path from a "wide-angle" position illustrated in solid lines in FIG. 1 to the "telephoto" position illustrated in dotted lines. The movement of the rear lens barrel 38 is governed by the shape of the outer cam slots 32 and 34 in the fixed lens barrel 20. The shape of these cam slots and the movement of both the rear lens barrel 38 and lens IV affixed thereto are represented by the values for $S_4$ in Table 2.

Although the rear lens barrel is adapted to be rotated relative to the fixed lens barrel 20, the interior lens mount 39 is permitted to move only longitudinally and is prevented from rotating relative to the fixed lens barrel. This is because the pin-like inner cam followers 52 and 54 attached to the interior lens mount extend through the arcuate inner cam slots 42 and 44 in the rear lens barrel 38 and into the longitudinal grooves 28 and 30 in the fixed lens barrel 20. Since the inner cam followers 52 and 54 can only move longitudinally in the longitudinal grooves 28 and 30 of the fixed lens barrel, the interior lens mount 39 can only move longitudinally relative to the fixed lens barrel. This longitudinal movement is governed by the shape of the arcuate inner cam slots 42 and 44 in the rear lens barrel 38 which is rotatable relative to both the fixed lens barrel 20 and the interior lens mount 39.

The shape of these inner cam slots 42 and 44 and the relative movement between the interior lens mount 39 (carrying the doublet II, III) and the rear lens barrel 38 (carrying lens IV) are represented by the values for $S_3$ in Table 2. The movement of the doublet (lenses II and III) relative to the fixed front lens I is represented by the values for $S_1$ in Table 2 and is the combined result of the movement of the rear lens barrel 38 (governed by the spiral outer cam slots 32 and 34) and of the movement of the interior lens mount 39 relative to the rear lens barrel (which relative movement is governed by the arcuate inner cam slots 42 and 44).

The nonlinear relative movement between the zooming components, i.e., the doublet II–III and the lens IV, thus is governed by the configuration of the inner cam slots 42 and 44, and is computed to hold the distance from the fixed lenses, such as lens I, to the focal point at a constant value, i.e., in the film plane, throughout all zooming positions.

The mechanism 10 described is particularly adapted for the zoom lens system described and is the preferred mechanism for maintaining the relationships between the various lens elements of the system. However, various other means may be devised for mounting the lenses of the system and for effecting the required movement of the zooming components relative to one another and relative to the fixed lens components.

The foregoing detailed description of the preferred embodiment has been given only by way of example and will be readily apparent to those skilled in the art that many modifications may be made in the structural details without departing from the spirit and scope of the invention as defined in the claims.

What is claimed is:

1. A zoom lens system made substantially according to the following table:

| LENS ELEMENT | RADII (mm.) | THICKNESS AND SPACING (mm.) |
|---|---|---|
| I | $R_1 -64.90$ | $T_1 = 1.207$ |
|   | $R_2 +42.190$ | $S_1 =$ Variable (29.612 to 4.785) |
| II | $R_3$ Plano | $T_2 = 4.414$ |
|   | $R_4 -36.609$ | $S_2 = 0.118$ |
| III | $R_5 +27.589$ | $T_3 = 6.602$ |
|   | $R_6 -92.480$ | $S_3 =$ Variable (1.897 to 5.307) |
| IV | $R_7 -92.467$ | $T_4 = 1.208$ |
|   | $R_8 +92.467$ | $S_4$ to Stop = Variable (7.098 to 28.515) | where the lens elements are numbered from front to rear in the first column, the radii of curvature R of the lens elements are given in the second column and the spaces S between and the thickness T of the lens elements are given in the third column.

2. The zoom lens system of claim 1 wherein the characteristics set forth in the following table hold substantially true at the various focal lengths.

| FOCAL LENGTH mm. | $S_1$ | $S_3$ | $S_4$ |
|---|---|---|---|
| 9.004 | 29.612 | 1.897 | 7.098 |
| 10.288 | 25.279 | 1.338 | 11.990 |
| 11.614 | 21.424 | 1.184 | 15.999 |
|   |   | (Minimum Shift) |   |
| 11.971 | 20.480 | 1.197 | 16.931 |
| 13.929 | 15.895 | 1.563 | 21.158 |
| 16.208 | 11.551 | 2.450 | 24.606 |
| 19.439 | 6.736 | 4.250 | 27.621 |
| 21.032 | 4.785 | 5.307 | 28.515. |

3. The zoom lens system of claim 1 wherein the sum of three variable spacings $S_1$, $S_3$ and $S_4$ is 38.607 mm.

4. A zoom lens system made in accordance with claim 1 wherein lens elements I, II and III are a mean index of refraction ($N_e$) of approximately 1.6256 and a Nu value ($\nu$) of 57.79, lens elements IV and VIII have a means index of refraction ($N_e$) of 1.8127 and a Nu value ($\nu$) of 25.24, and lens elements V, VI and VII have a mean index of refraction ($N_e$) of 1.6940 and a Nu value ($\nu$) of 54.48.

5. A zoom lens system comprising a front section and a rear section, said front section consisting of four lens elements made substantially according to the following table:

| LENS ELEMENT | RADII (mm.) | THICKNESS AND SPACING (mm.) |
|---|---|---|
| I | $R_1 -64.90$ | $T_1 = 1.207$ |
|   | $R_2 +42.190$ | $S_1 =$ Variable (29.612 to 4.785) |
| II | $R_3$ Plano | $T_2 = 4.414$ |
|   | $R_4 -36.609$ | $S_2 = 0.118$ |
| III | $R_5 +27.589$ | $T_3 = 6.602$ |
|   | $R_6 -92.480$ | $S_3 =$ Variable (1.897 to 5.307) |
| IV | $R_7 -92.467$ | $T_4 = 1.208$ |
|   | $R_8 +92.467$ | $S_4$ To Stop = Variable (7.098 to 28.515) | where the lens elements are numbered from the front to rear in the first column; the radii of curvature R of the lens elements are given in the second column and the spaces S between and the thicknesses T of the lens elements are given in the third column; and said rear section comprising a plurality of lens elements designed to compensate for aberrations produced by said front section of said system.

6. The zoom lens system of claim 5 wherein the characteristics set forth in the following table hold substantially true at the various focal lengths for the system:

| FOCAL LENGTH mm. | $S_1$ | $S_3$ | $S_4$ |
|---|---|---|---|
| 9.004 | 29.612 | 1.897 | 7.098 |
| 10.288 | 25.279 | 1.338 | 11.990 |
| 11.614 | 21.424 | 1.184 | 15.999 |
|   |   | (Minimum Shift) |   |
| 11.971 | 20.480 | 1.197 | 16.931 |
| 13.929 | 15.895 | 1.563 | 21.158 |
| 16.208 | 11.551 | 2.450 | 24.606 |
| 19.439 | 6.736 | 4.250 | 27.621 |
| 21.032 | 4.785 | 5.307 | 28.515. |

7. A zoom lens system comprising a front section and a rear section, said front section including a fixed lens barrel having a bore with a longitudinal first guide means and a circumferential spiral shaped first cam slot, said fixed lens barrel carrying a fixed front lens member, a drive barrel mounted for rotation circumjacent said fixed lens barrel and having a bore with a longitudinal second guide means, a movable rear lens barrel slidably mounted within the bore of said fixed lens barrel and carrying a rear lens member, said movable rear lens barrel having a circumferential arcuate second slot, a first cam follower attached to and extending radially outwardly from said movable rear lens barrel, said first cam follower extending extending through said first cam slot in said fixed lens barrel and into guiding contact with the longitudinal second guide means in said drive barrel bore, whereby rotation of said drive barrel relative to said fixed lens barrel will cause said first cam follower to move within said spiral shaped first cam slot and will cause corressponding rotational and axial sliding movement of said movable lens barrel within said fixed lens barrel, an interior lens mount slidably movable within the bore of said movable lens barrel and carrying an intermediate lens assembly, a second cam follower attached to and extending radially outwardly from said interior lens mount, said second cam follower extending through said second cam slot in said movable lens barrel and into guiding contact with the longitudinal first guide means in said fixed lens barrel bore, whereby rotation of said movable rear lens barrel will cause relative movement of said second cam slot and said second cam follower and will cause corresponding axial movement of said interior lens mount and said intermediate lens assembly carried thereby toward and away from said rear lens member carried by said movable rear lens barrel, the relative movement between said intermediate lens assembly and said rear lens member being governed by the configuration of said second cam slots and being such that the back focal length of the system will remain constant as the intermediate lens assembly and the rear lens member are moved toward and away from the front lens member, said rear section having a plurality of lens elements and means mounting said elements in fixed position rearwardly of said rear lens member of said front section.

8. The zoom lens system of claim 7 wherein the front lens member, comprises a single biconcave lens element I, the intermediate lens assembly comprises a doublet of a plano-convex lens element II and a biconvex lens element III and the rear lens member comprises a single biconcave lens element IV and said lens element have the following characteristics:

| LENS ELEMENT | RADII (mm.) | THICKNESS AND SPACING (mm.) |
| --- | --- | --- |
| I | $R_1$−64.90 | $T_1$=1.207 |
|   | $R_2$+42.190 | $S_1$= Variable (29.612 to 4.785) |
| II | $R_3$ Plano | $T_2$=4.414 |
|   | $R_4$−36.609 | $S_2$=0.118 |
| III | $R_5$+27.589 | $T_3$=6.602 |
|   | $R_6$−92.480 | $S_3$= Variable (1.897 to 5.307) |
| IV | $R_7$−92.467 | $T_4$=1.208 |
|   | $R_8$+92.467 | $S_4$ To Stop = Variable (7.098 to 28.515) | where the lens elements are numbered from front to rear in the first column, the radius of curvature R of the lens elements are given in the second column and the spaces S between and the thickness T of the lens elements are given in the third column.

* * * * *

UNITED STATES PATENT OFFICE
CERTIFICATE OF CORRECTION

PATENT NO. : 3,890,036
DATED : June 17, 1975
INVENTOR(S) : DAVID S. GREY

It is certified that error appears in the above-identified patent and that said Letters Patent are hereby corrected as shown below:

Column 1, line 14 - "of" should be -- or --

Column 2, line 38 - "of" (2nd occurrence) should be -- or --

Column 2, line 43 - after "lens" insert -- V, a divergent meniscus lens --

Column 3, line 54 - "of" (2nd occurrence) should be -- in --

Column 5, line 36 - "improve-" should be -- move- --

Column 5, line 44 - "foward" should be -- forward --

Column 7, line 67 (Claim 4) - "means" should be -- mean --

Column 8, line 22 (Claim 5) - delete "the" (2nd occurrence) after "from"

Column 8, line 57 (Claim 7) - before "slot" insert -- cam --

Column 8, line 65 (Claim 7) - "corressponding" should be -- corresponding --

Column 10, line 4 (Claim 8) - "element" should be -- elements --

Signed and Sealed this ninth Day of September 1975

[SEAL]

Attest:

RUTH C. MASON
*Attesting Officer*

C. MARSHALL DANN
*Commissioner of Patents and Trademarks*